United States Patent [19]

Kissane

[11] 3,708,238
[45] Jan. 2, 1973

[54] ALIGNMENT JIG FOR ELECTRIC SCREW DRIVER OR THE LIKE

[75] Inventor: Richard W. Kissane, St. Louis County, Mo. 63131

[73] Assignee: Speed Fastener, Inc., St. Louis, Mo.

[22] Filed: Dec. 3, 1970

[21] Appl. No.: 94,921

[52] U.S. Cl. ............................................. 408/112
[51] Int. Cl. .............................................. B23b 45/14
[58] Field of Search ........................ 408/112, 110, 95

[56] References Cited

UNITED STATES PATENTS 2,568,886  9/1951  Fried ................................. 408/95
2,997,900  8/1961  Pugsley ............................. 408/95
2,151,205  3/1939  Hawn ................................ 408/110
3,065,654  11/1962  Critelli et al. ..................... 408/112

*Primary Examiner*—Gil Weidenfeld
*Attorney*—Haverstock & Heywood

[57] ABSTRACT

An alignment jib having a mounting portion secured to an electrically powered rotary tool and an abutment portion carried thereby for relative rectilinear axial movement to maintain the tool perpendicular to a work surface during the operation thereof.

2 Claims 4 Drawing Figure

PATENTED JAN 2 1973 3,708,238

INVENTOR
Richard W. Kissane
BY Haverstock & Heywood
ATTORNEY

ALIGNMENT JIG FOR ELECTRIC SCREW DRIVER OR THE LIKE

BACKGROUND OF THE INVENTION

This invention relates generally to electrical rotary tools, and more particularly to improvements in alignment means therefor.

In the use of electric screw drivers, drills and like rotary tools in industry, commercial construction and "do-it-yourself" home projects, a major problem encountered by skilled craftsmen as well as amateurs is proper tool alignment to assure that screw fasteners applied or bore holes formed are "square" or normal to the work surface. The problem is particularly accute in applying screw fasteners of the self-tapping type to assemble metal parts since proper seating of the screw head in full annular bearing engagement against the metal work surface may be critical. In addition, the tendancy of a screw fastener or drill bit to "walk" or move laterally from the desired application point may cause surface scoring or misalignment and perforation of such metal parts.

SUMMARY OF THE INVENTION

Briefly, the invention comprises an alignment jig fastened to an electrical rotary tool and having a work surface abutment portion with a planar surface extending normal to the rotational axis of the tool and being relatively axially movable in such normal plane.

A principal object of the present invention is to provide an alignment jig for an electrical rotary tool that will maintain the working end of such tool perpendicular to a work surface during operation, and which will assure positive application of screw fasteners, drill bits or the like normal thereto Another object is to provide an alignment jig which will prevent the movement of screw fasteners, drill bits or the like laterally along the work surface away from the application point due to "walking" or slippage.

A further object is to provide an alignment jig for use with all types of electrical rotary tools and which can be easily and quickly affixed thereto and removed therefrom.

A still further object is to provide an improved alignment jig for electric rotary tools that is relatively easy to construct, assemble and use and which is compact, durable and provides accurate alignment.

These and still other objects and advantages will become readily apparent hereinafter.

BRIEF DESCRIPTION OF THE DRAWINGS

For purposes of illustration and disclosure, the invention is embodied in the parts and in the arrangement or combination of parts hereinafter described and claimed. In the accompanying drawing forming a part of the specification and wherein like numerals refer to like parts:

DESCRIPTION OF THE PREFERRED EMBODIMENTS

Figure 1:
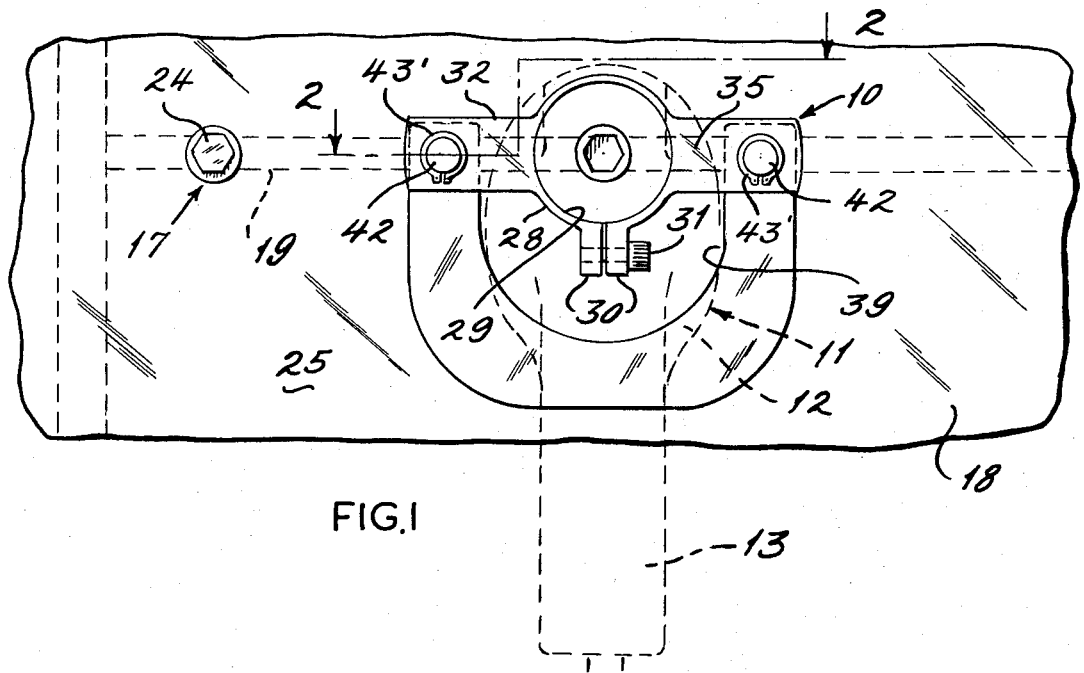
FIG. 1 is an elevational view of an alignment jig embodying the present invention as secured to an electric rotary tool, shown in broken lines, and in operative position relative to a work surface.

Referring now to the drawing, an alignment jig 10 embodying the invention is adapted for use with different electrical rotary tools and different models thereof, such as electric screw drivers or electric drills. A typical electric screw driver 11 is illustrated in broken lines in FIGS. 1 and 2 and has a main housing 12 for an electric motor (not shown) with an integral handle grip 13 and trigger-type switch (not shown). The arbor or spindle 14 of the tool 11 is journaled in a fixed housing sleeve 15 concentric with the rotational axis and has a chuck 16 at its working end for releaseably holding screw fasteners 17. It is believed that such electrical tools 11 are well-known and further elaboration for environmental purposes is deemed unnecessary.

For purposes of illustration the tool 11 and alignment jig 10 are shown in operative condition as applying screw fasteners 17 to secure a metal panel siding 18 to metal purlons 19 or like structural framing members. A typical screw fastener 17 is of the self-drilling and self-tapping type having a threaded shank 21 and a cutting tip 22, and an annular flange or shoulder 23 is formed at the head 24 for seating against the planar outer work surface 25 of the metal panel 18. It is important that such screw fasteners 17 be applied perpendicular or normal to the work surface 25 so that the shoulder 23 is in full annular bearing engagement or the fastener may score, dimple, crimp or buckle the panel 18 and may even cut through the panel so that it is not securely assembled to the purlon 19.

Figure 3:
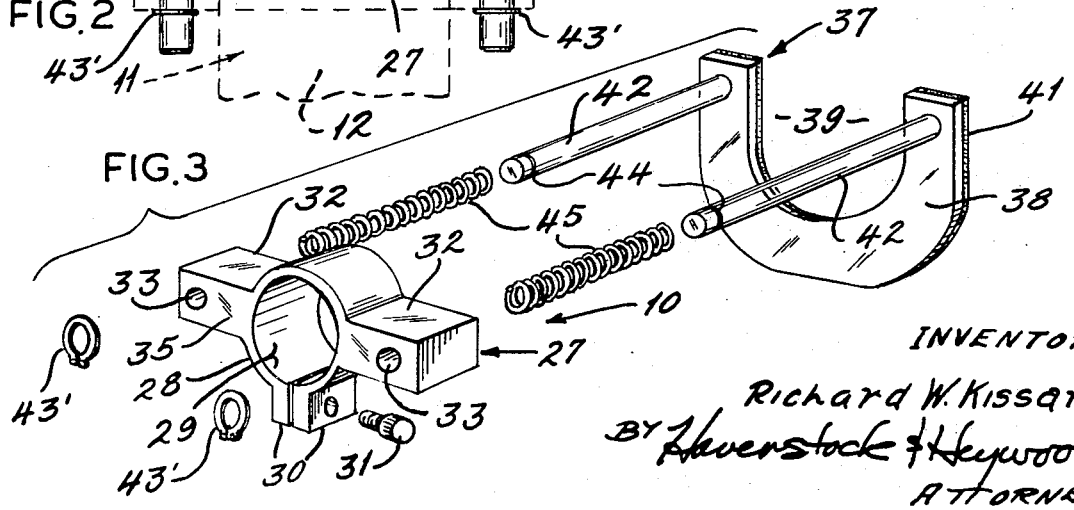
FIG. 3 is an exploded perspective view of the alignment jig embodying the invention.

Referring to FIG. 3, the alignment jig 10 comprises a mounting portion 27 having a central split collar 28 with a bore wall 29 to receive the spindle journal sleeve 15 of the tool housing 12 and depending lugs 30 with a set screw 31 forming a clamping means for releasably securing the collar 28 on the sleeve 15. Opposite radially extending arms 32 are formed integral with the collar 28 and parallel guide bore 33 are provided in predetermined spaced relation extending through the arms 32 between the front and rear surfaces 34 and 35 thereof, the guide bores 33 extending parallel with the rotational axis of the spindle 14 when the mounting portion 27 is assembled on the sleeve 15. It will be noted that the axial dimension of the guide bores 33 between the surfaces 34 and 35 of the arms 32 is substantial, as will be described more fully.

The alignment jig 10 also comprises an abutment portion 37 having a rigid bearing plate 38 of discontinuous, open-sided or U-shaped configuration defining an axial clearance area 39 for tool operation between laterally spaced free end portions of the bearing plate 38. The bearing plate 38 has a planar front surface 40 to which a resilient pad or cushion 41 is affixed. A pair of guide rods 42 are rigidly secured to the bearing plate 38, such as by bolts 43, press fit or the like, and extend perpendicular to the bearing plate and rearwardly therefrom in predetermined spaced parallel relation. The guide rods 42 are slidably received in the guide bores 33 of the mounting portion 27, and the substantial axial dimension of the guide bores 33 maintains the parallel axial relationship of the guide rods 42 to the rotational axis of the tool so that the planar front surface 40 of the bearing plate 38 is always perpendicular thereto. The guide rods 42 are retained in assembled position on the mounting portion 27 by C-shaped snap rings 43' positioned in grooves 44 rearwardly of the rear surface 35 of the arms 32, and normally in abutment therewith by the yieldable biasing action of spring members 45 carried on the guide rods 42 and being disposed between the bearing plate 38 and the front surface 34 of the mounting portion arms 32. In other words, the abutment portion 37 is biased by the spring means 45 away from the mounting portion 27, and the springs exert a sufficient resistance to yieldable movement to provide firm surface abutment between the bearing plate 38, cushion 41 and work surface 25.

It will be readily apparent that the parallelism of the guide means, including the guide rods 42 and guide bores 33, to the rotational axis of the tool 11 and the perpendicular relationship of the bearing plate surface 40 thereto, assures that the working end 16 and screw fastener 17 or the like will be normal to the work surface 25 when the abutment portion 37 is firmly seated thereagainst.

Figure 2:
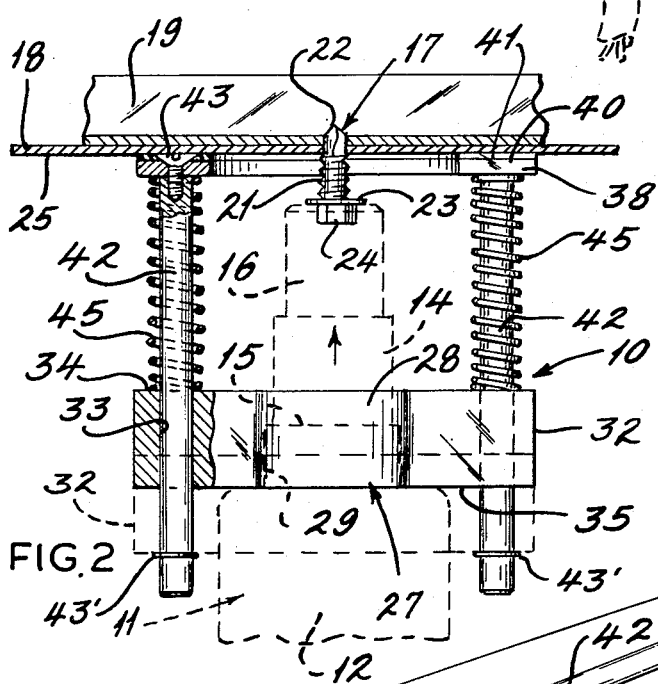
FIG. 2 is a top plan view, partly in section, taken along line 2—2 of FIG. 1.

The tool 11 is operated in a conventional manner by actuating the motor and advancing the tool toward the work surface 25 in the direction of the arrow in FIG. 2 to cause the screw fastener 17 to bite into the metal panel 18 and purlon 19 and seat the annular flange firmly against the work surface. The cushion 41 not only prevents the alignment jig 10 from marring the work surface 25, but provides a frictional engagement to obviate lateral tool movement due to walking or slippage incident to skewing of the screw fastener on the work surface.

Figure 4:
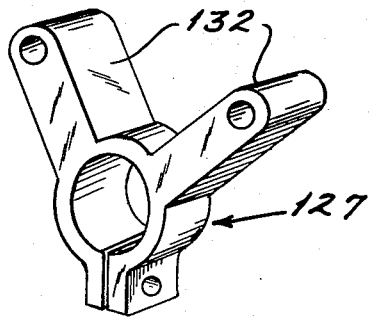
FIG. 4 is a perspective view of an alternate form of mounting collar for the alignment jig.

FIG. 4 illustrates a modified alignment jig mounting portion 127 in which the arms 132 are angularly disposed at a 90° angle or less to facilitate tool operation in corners. It will be apparent that the abutment portion (not shown) will be of similarly formed construction and the remaining construction of such modified alignment jig may be identical with the embodiment already described. Furthermore, the modified form of alignment jig for corner application of screw fasteners 17 can be quickly and easily substituted for the other embodiment, or utilized in place thereof for all types of rotary alignment operations.

What is claimed is:

1. An alignment jig for a portable, electrically powered, rotary tool having a housing with a stationary cylindrical portion adjacent to a working end with a rotational axis adapted for actuation normal to the plane of a work surface, said alignment jig comprising a mounting portion including a split central collar with a cylindrical bore adapted to concentrically receive said cylindrical portion of said tool housing and means for removably securing said central collar thereon, said mounting portion also including spaced arms extending radially outwardly from said central collar, an abutment portion including a rigid bearing plate axially spaced from said mounting portion and having a planar surface on the remote side therefrom with resilient cushion means extending over substantially the entire planar surface for yieldable, frictional engagement with the work surface, said bearing plate having a discontinuous open-sided configuration with laterally spaced end portions aligned axially with the spaced arms of said mounting portion and defining through the open-side of the bearing plate an axial clearance area for visibly accommodating operation of the rotary tool and guide means between the abutment and mounting portions including guide bores of substantial axial length formed in said spaced arms of said mounting portion and extending parallel with the cylindrical bore of said central collar and the rotational axis of said working end of said tool, said guide means also including guide rods having first ends fixedly secured to the laterally spaced end portions of said abutment portion and extending in spaced parallel relation away from and normal to the planar surface thereof, said guide rods being slidably positioned in said guide bores and having second ends with fixed abutment means adjacent thereto on the opposite side of said mounting portion from said abutment portion, and spring means positioned on said guide rods between said mounting and abutment portions to normally bias them apart.

2. The alignment jig according to claim 1, in which a pair of radially extending spaced arms are formed on said central collar at an angle of about 90° or less.

* * * * *